United States Patent
Liu et al.

(10) Patent No.: US 11,356,207 B2
(45) Date of Patent: Jun. 7, 2022

(54) HARQ-ACK FEEDBACK METHOD, A HARQ-ACK EXTRACTION METHOD, A BASE STATION, AND A USER EQUIPMENT

(71) Applicant: NTT DOCOMO, INC., Tokyo (JP)

(72) Inventors: Jiahui Liu, Beijing (CN); Qin Mu, Beijing (CN); Liu Liu, Beijing (CN); Naoto Okubo, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 283 days.

(21) Appl. No.: 16/609,594

(22) PCT Filed: Mar. 7, 2018

(86) PCT No.: PCT/CN2018/078232
§ 371 (c)(1),
(2) Date: Oct. 30, 2019

(87) PCT Pub. No.: WO2018/201789
PCT Pub. Date: Nov. 8, 2018

(65) Prior Publication Data
US 2020/0067652 A1 Feb. 27, 2020

(30) Foreign Application Priority Data
May 4, 2017 (CN) .......................... 201710308732.0

(51) Int. Cl.
*H04L 1/18* (2006.01)
*H04L 1/00* (2006.01)
*H04W 72/04* (2009.01)

(52) U.S. Cl.
CPC .......... *H04L 1/1812* (2013.01); *H04L 1/0061* (2013.01); *H04L 1/1893* (2013.01); *H04W 72/042* (2013.01)

(58) Field of Classification Search
CPC ... H04L 1/1812; H04L 1/1854; H04L 1/0061; H04L 5/00; H04L 1/1893; H04L 1/1887; H04W 72/042
See application file for complete search history.

(56) References Cited

U.S. PATENT DOCUMENTS

| 10,165,594 B2 | 12/2018 | Frederiksen et al. |
| 2016/0226646 A1* | 8/2016 | Boariu .............. H04W 72/0413 |
| 2017/0064694 A1 | 3/2017 | Wang et al. |

FOREIGN PATENT DOCUMENTS

| CN | 101940046 A | 1/2011 |
| CN | 104125045 A | 10/2014 |
| CN | 106559187 A | 4/2017 |

OTHER PUBLICATIONS

International Search Report from PCT/CN2018/078232; dated Apr. 17, 2018.
(Continued)

*Primary Examiner* — Anez C Ebrahim
(74) *Attorney, Agent, or Firm* — Osha Bergman Watanabe & Burton LLP

(57) ABSTRACT

Disclosed are a HARQ-ACK feedback method, a HARQ-ACK extraction method, a base station, and a user equipment. The Hybrid Automatic Repeat reQuest ACKnowledgement (HARQ-ACK) feedback method is performed by a base station, and used to feed back corresponding HARQ-ACKs to a plurality of user equipments. The method includes: generating, by employing a plurality of HARQ-ACKs corresponding to the plurality of user equipments, at least one piece of downlink control information, where for each user equipment, an implicit mapping relationship exists between the user equipment and one or more information bits of the downlink control information; and transmitting to the plurality of user equipments the downlink control information.

20 Claims, 6 Drawing Sheets

(56) References Cited

OTHER PUBLICATIONS

International Preliminary Report on Patentability issued in PCT/CN2018/078232, dated Nov. 5, 2019.

* cited by examiner

Indicate, by employing RRC signaling, a position of HARQ-ACK information for each UE Scrambled by HARQ-RNTI

HARQ-ACK FEEDBACK METHOD, A HARQ-ACK EXTRACTION METHOD, A BASE STATION, AND A USER EQUIPMENT

CROSS-REFERENCE TO RELATED APPLICATIONS

This application is a 371 U.S. National Stage of International Application No. PCT/CN2018/078232, filed on Mar. 7, 2018, which claims priority to Chinese Application No. 201710308732.0, filed on May 4, 2017. The entire disclosures of the above applications are incorporated herein by reference.

TECHNICAL FIELD

The present invention relates to a field of communication, and in particular to a Hybrid Automatic Repeat reQuest ACKnowledgement (HARQ-ACK) feedback method at a base station side, a HARQ-ACK extraction method at a user equipment side, a base station, and a user equipment.

BACKGROUND

With development of the mobile communication industry and ever-growing demand for mobile data services, requirements on speed and Quality of Service (QoS) of mobile communications are getting higher. Currently, standards for the network diversified, wideband, integrated and intelligent 5th generation (5G) mobile communication technology are being developed and applied. In an application scenario of an Internet of Things, it is expected to implement massive connections between people and objects, as well as between objects, to improve network coverage rate and resource efficiency and save power consumption of a user equipment. In Rel-13, it is proposed to apply uplink data retransmission to improve network coverage rate. For example, a set of numbers of times of uplink data retransmission may be defined as: $\{1, 4, 8, 16, 32 \ldots 2048\}$. With respect to the maximum number of times of retransmissions 16 as indicated by Radio Resource Control (RRC), the number of times of retransmissions for a specific user equipment (UE) may be set to $\{1, 4, 8, 16\}$. Since a granularity gap of uplink transmission is too large and measurement is inaccurate, uplink data in the IoT application scenario should support early acknowledgement from a base station, that is, the base station needs to transmit a HARQ-ACK to the user.

When the HARQ-ACK fed back to the user equipment by the base station is ACK, it indicates that the base station has correctly received and decoded data transmitted by the user equipment. That is, the user equipment no longer needs to transmit the data to the base station.

In order to implement early acknowledgement for reception of uplink data in the IoT application scenario, a group-based HARQ-ACK feedback mechanism has been proposed. Specifically, the base station may indicate HARQ-ACK information for a plurality of user equipments in Downlink Control Information (DCI). With respect to the DCI for HARQ-ACK feedback, the base station may scramble, by employing a Hybrid Automatic Repeat reQuest Radio Network Temporary Identifier (HARQ-RNTI), a Cyclic Redundancy Check (CRC) calculated based on the HARQ-ACK information for the plurality of user equipments. Accordingly, the user equipment checks the received DCI according to the HARQ-RNTI, so as to identify whether the received DCI is the DCI for HARQ-ACK feedback, and further determine a HARQ-ACK value belonging to itself.

In this case, the DCI for HARQ-ACK feedback carries HARQ-ACKs for each user equipment (shown in FIG. 1). In order that each user equipment can identify HARQ-ACK information belonging to the user equipment, the base station notifies, through Radio Resource Control (RRC) signaling, each user equipment of a bit position of HARQ-ACK information corresponding thereto. However, a problem with this method is that overhead of DownLink (DL) signaling is enormous in a scenario of massive connections with many user equipments.

SUMMARY

In view of the above circumstances, it is expected to provide a HARQ-ACK feedback method, a HARQ-ACK extraction method, a base station, and a user equipment that can effectively reduce downlink signaling overhead.

According to a first aspect of the present invention, there is provided a Hybrid Automatic Repeat reQuest ACKnowledgement (HARQ-ACK) feedback method performed by a base station, and used to feed back corresponding HARQ-ACKs to a plurality of user equipments, the method comprising: generating, by employing a plurality of HARQ-ACKs corresponding to the plurality of user equipments, at least one piece of downlink control information, wherein for each user equipment, an implicit mapping relationship exists between the user equipment and one or more information bits of the downlink control information; and transmitting to the plurality of user equipments the downlink control information.

According to a second aspect of the present invention, there is provided a Hybrid Automatic Repeat reQuest ACKnowledgement (HARQ-ACK) extraction method performed by a user equipment, comprising: receiving at least one piece of downlink control information for feeding back corresponding HARQ-ACKs to a plurality of user equipments transmitted by a base station, wherein the plurality of user equipments include the user equipment and other user equipments; and determining a HARQ-ACK corresponding to the user equipment, based on an implicit mapping relationship between the user equipment and one or more information bits of the downlink control information.

According to a third aspect of the present invention, there is provided a base station, configured to perform Hybrid Automatic Repeat reQuest ACKnowledgement (HARQ-ACK) feedback to a plurality of user equipments, comprising: a generating unit, configured to generate, by employing a plurality of HARQ-ACKs corresponding to the plurality of user equipments, at least one piece of downlink control information, wherein for each user equipment, an implicit mapping relationship exists between the user equipment and one or more information bits of the downlink control information; and a transmitting unit, configured to transmit to the plurality of user equipments the downlink control information.

According to a fourth aspect of the present invention, there is provided a user equipment, configured to perform extraction of Hybrid Automatic Repeat reQuest ACKnowledgements (HARQ-ACKs) from a base station, comprising: a receiving unit, configured to receive at least one piece of downlink control information for feeding back corresponding HARQ-ACKs to a plurality of user equipments transmitted by a base station, wherein the plurality of user equipments include the user equipment and other user equipments; and a determining unit, configured to determine a HARQ-ACK corresponding to the user equipment, based on an implicit mapping relationship between the user equipment and one or more information bits of the downlink control information.

By employing the HARQ-ACK feedback method, the HARQ-ACK extraction method, the base station, and the user equipment according to the present invention, an implicit mapping relationship is established between the plurality of user equipments and information bits of the downlink control information, so that each of the user equipments can autonomously determine corresponding HARQ-ACK in the downlink control information, without DL signaling to notify the user equipments one by one of the information bits of the HARQ-ACKs corresponding to the respective user equipments in the downlink control information. Therefore, DL signaling overhead is significantly reduced as compared with the prior art.

DETAILED DESCRIPTION

Respective preferred embodiments of the present invention will be described below with reference to accompanying drawings. The following description with reference to the accompanying drawings is provided to assist in a comprehensive understanding of exemplary embodiments of the present invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the present invention. In addition, descriptions of well-known functions and constructions in the art may be omitted to make the specification clearer and concise.

(I) HARQ-ACK Feedback Method on Base Station Side

Figure 1:
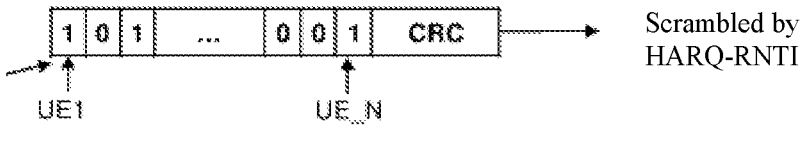
FIG. 1 is a schematic diagram illustrating DCI content for HARQ-ACK feedback in the prior art.
Figure 2:
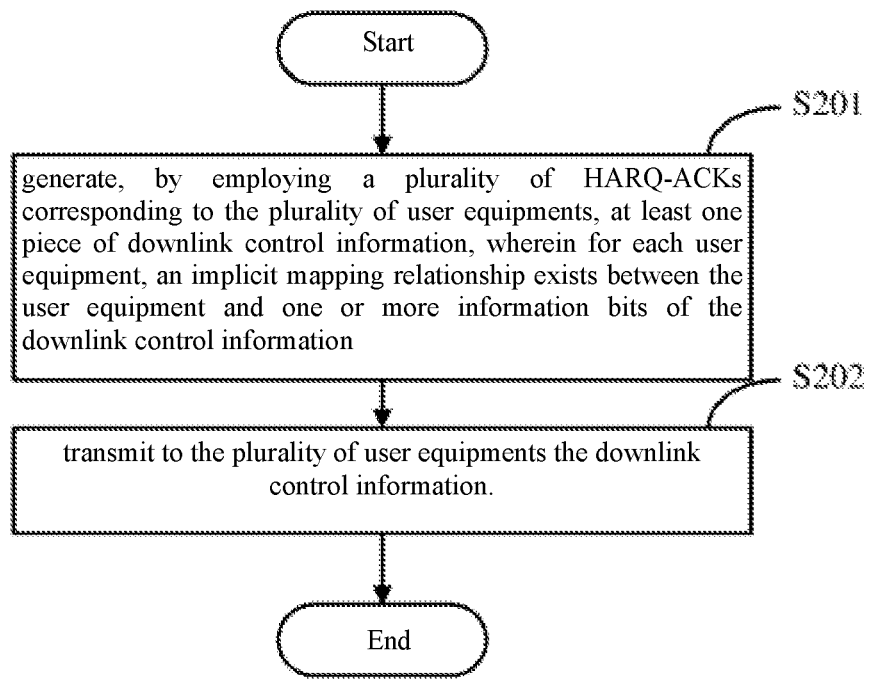
FIG. 2 is a flow chart illustrating a procedure of a Hybrid Automatic Repeat reQuest ACKnowledgement (HARQ-ACK) feedback method performed by a base station according to the present invention.

Firstly, a Hybrid Automatic Repeat reQuest ACKnowledgement (HARQ-ACK) feedback method performed by a base station according to the present invention will be described with reference to FIG. 2. The HARQ-ACK feedback method is used to feed back corresponding HARQ-ACKs to a plurality of user equipments. As shown in FIG. 2, the method comprises steps below.

Firstly, in step S201, at least one piece of Downlink Control Information (DCI) is generated, by employing a plurality of HARQ-ACKs corresponding to the plurality of user equipments, where for each user equipment, an implicit mapping relationship exists between the user equipment and one or more information bits of the downlink control information.

A value of an information bit of the downlink control information may be 1 or 0. When the value is 1, it indicates that the HARQ-ACK is ACK. That is, the base station has correctly received and decoded data, and the user equipment no longer needs to continue to retransmit. When the value is 0, it indicates that the base station has not received the data or has not decoded the data correctly.

Then, in step S202, the downlink control information is transmitted to the plurality of user equipments.

In the present invention, an implicit mapping relationship is established between the plurality of user equipments and the information bits of the downlink control information, so that each of the user equipments can autonomously determine corresponding HARQ-ACK in the downlink control information, without DL RRC signaling to notify the user equipments one by one of the information bits of the HARQ-ACKs corresponding to the respective user equipments in the downlink control information for HARQ-ACK feedback. Therefore, DL signaling overhead is significantly reduced as compared with the prior art.

Hereinafter, descriptions of various specific implementation modes will be given in aspects such as: based on what type of data to perform the implicit mapping, and a corresponding relationship between the information bits of the DCI and resource locations in the implicit mapping.

First Embodiment

In this first embodiment, the implicit mapping is performed based on resource locations for uplink data transmission allocated by a base station to a user equipment.

As a preferred implementation mode, in the HARQ-ACK feedback method performed by the base station according to the present invention, for each user equipment, an implicit mapping relationship exists between the user equipment and one or more information bits of the downlink control information, based on a resource location for uplink data transmission allocated by the base station to the user equipment, for example, a number or an index of a Physical Resource Block (PRB).

(1) Scheme 1: HARQ-ACK Feedback Performed with One Piece of DCI

In scheme 1, the at least one piece of downlink control information refers to one piece of downlink control information. The resource locations for uplink data transmission allocated by the base station to the user equipment may be a single PRB, a plurality of PRBs, or may also be one group of PRBs or a plurality of groups of PRBs. For example, the one group of PRBs may be 1 Narrow Band (NB), that is, 6 PRBs, or may also be 3 PRBs predefined. In a case where the base station allocates to the user equipment a single PRB, an implicit mapping relationship exists between the user equipment and one information bit of the DCI. However, in a case where the base station allocates to the user equipment a plurality of PRBs or a plurality of groups of PRBs, an implicit mapping relationship exists between the user equipment and a plurality of information bits of the DCI, based on a plurality of PRB indexes or a plurality of groups of PRB group indexes. Alternatively, in a case where the base station allocates to the user equipment a plurality of PRBs, or one or more groups of PRBs, an implicit mapping relationship may also exist between the user equipment and one information bit of the DCI, based on a starting PRB index, a PRB group index, or a starting PRB group index.

Figure 3:
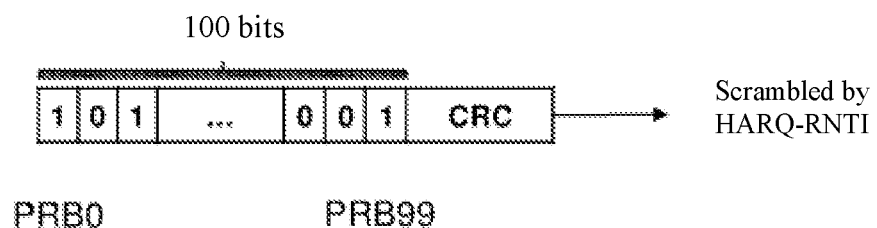
FIG. 3 is a schematic diagram illustrating a first example of a DCI format of scheme 1 according to a first embodiment of the present invention.

FIG. 3 is a schematic diagram illustrating a first example of performing HARQ-ACK feedback to the plurality of user equipments with one piece of DCI. In FIG. 3, a case where one information bit of the DCI corresponds to one PRB (i.e., a single resource location) is shown. For example, an implicit mapping relationship exists between the user equipment and one information bit of the DCI, based on a starting PRB index of the allocated PRBs, that is, a position of the information bit corresponding to the user equipment in the DCI is determined based on the starting PRB index. However, the present invention is not only limited thereto.

As an example, FIG. 3 shows a case where data information of the DCI for the HARQ-ACKs includes 100 information bits. However, those skilled in the art should understand that, the case where the DCI includes 100 information bits is merely an example, and the present invention is not only limited thereto. The data information of the DCI for the HARQ-ACKs may further include other number of bits that is less than 100, or greater than 100.

As shown in FIG. 3, in the DCI, a first bit corresponds to PRB 0, a second bit corresponds to PRB 1, . . . , and a $99^{th}$ bit corresponds to PRB 99. FIG. 3 shows a case where each of the 100 bits corresponds to one PRB index. However, those skilled in the art should understand that the present invention is not only limited thereto. For example, in a case where there are fewer user equipments, only a portion of the 100 bits may be used to correspond to corresponding PRB indexes.

Figure 4:
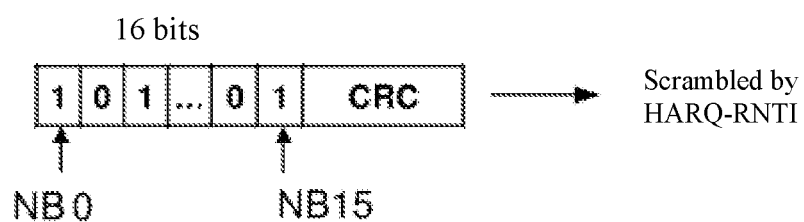
FIG. 4 is a schematic diagram illustrating a second example of a DCI format of scheme 1 according to the first embodiment of the present invention.

Alternatively, FIG. 4 is a schematic diagram illustrating a second example of performing HARQ-ACK feedback to the plurality of user equipments with one piece of DCI. In FIG. 4, a case where one information bit of the DCI corresponds to a group of PRBs (i.e., one resource location group) is shown.

In the case shown in FIG. 4, a group of PRBs (for example, NB0) corresponding to one information bit of the DCI may be allocated to one or more user equipments. In a case where a group of PRBs corresponding to one information bit of the DCI are allocated by the base station to a same user equipment, the information bit carries a value indicating the HARQ-ACK for the user equipment. In a case where a group of PRBs corresponding to one information bit of the DCI are allocated by the base station to a plurality of different user equipments, a pre-grouped PRB group may be mapped to one information bit of the DCI regardless of whether HARQ-ACK values of the plurality of user equipments corresponding to the respective PRBs in the PRB group are the same. It is described with a case where the PRB group includes three user equipments as an example. If values of HARQ-ACK corresponding to the three user equipments are all 1, a value of the one information bit of the DCI is set to 1. If the values of the HARQ-ACK corresponding to the three user equipments are not all 1, that is, at least one of the values of the HARQ-ACK corresponding to the three user equipments is 0, the value of the one information bit of the DCI is set to 0. That is, in this case, as long as there is a user equipment whose HARQ-ACK is NACK among the plurality of different user equipments, the information bit of the DCI corresponding to the plurality of different user equipments has a value of 0.

In addition, the step of generating at least one piece of downlink control information further includes: scrambling a Cyclic Redundancy Check (CRC) according to a fixed scrambling identifier (HARQ-RNTI), for identifying that the downlink control information is information for feeding back corresponding HARQ-ACKs to the plurality of user equipments. The user equipment firstly determines the downlink control information scrambled by the HARQ-RNTI, and further extracts a specific information bit value as the HARQ-ACK.

In a communication process between the base station and the user equipment, there are various types of DCI such as DCI for resource allocation, and DCI for HARQ-ACK feedback. Here, at the base station side, by scrambling the CRC with the HARQ-RNTI, the user equipment side can check by employing the HARQ-RNTI and the received CRC, so as to identify that the DCI is the DCI for HARQ-ACK feedback. The fixed scrambling identifier may be a conventionally defined value or a newly defined value, as long as the value is fixed.

(2) Scheme 2: HARQ-ACK Feedback Performed with a Plurality of Pieces of DCI

In scheme 2, the at least one piece of downlink control information refers to a plurality of pieces of downlink control information, and the plurality of pieces of downlink control information respectively correspond to different resource location groups.

Figure 5:
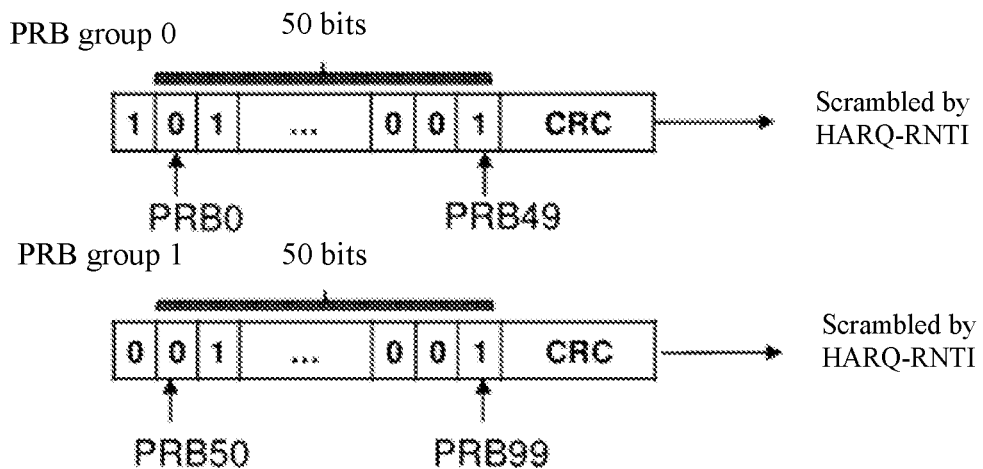
FIG. 5 is a schematic diagram illustrating a first example of a DCI format of scheme 2 according to the first embodiment of the present invention.

FIG. 5 shows a first implementation mode of scheme 2, where HARQ-ACK feedback is performed with two pieces of downlink control information. As shown in FIG. 5, PRB0 to PRB49 are grouped into PRB group 0, and PRB50 to PRB99 are grouped into PRB group 1. A resource location group identifier corresponding to PRB group 0 is 1, and a resource location group identifier corresponding to PRB group 1 is 0; or vice versa, the resource location group identifier corresponding to PRB group 0 is 0, and the resource location group identifier corresponding to PRB group 1 is 1.

In the case shown in FIG. 5, the step of generating at least one piece of downlink control information further includes: scrambling a Cyclic Redundancy Check (CRC) according to a fixed scrambling identifier (HARQ-RNTI), for identifying that the downlink control information is information for feeding back corresponding HARQ-ACKs to the plurality of user equipments; and setting a resource location group identifier in each piece of downlink control information, for identifying a resource location group corresponding to the piece of downlink control information.

In addition, FIG. 5 only shows two pieces of DCI, and a case where two PRB groups are identified by one flag bit (0, 1). However, those skilled in the art should understand that the present invention is not only limited thereto. For example, the present invention may be further applied to a case of more pieces of DCI (for example, 4 pieces of DCI). Of course, accordingly, in the case of 4 pieces of DCIs, four PRB groups may be differentiated by two flag bits (00, 01, 10, 11).

Figure 6:
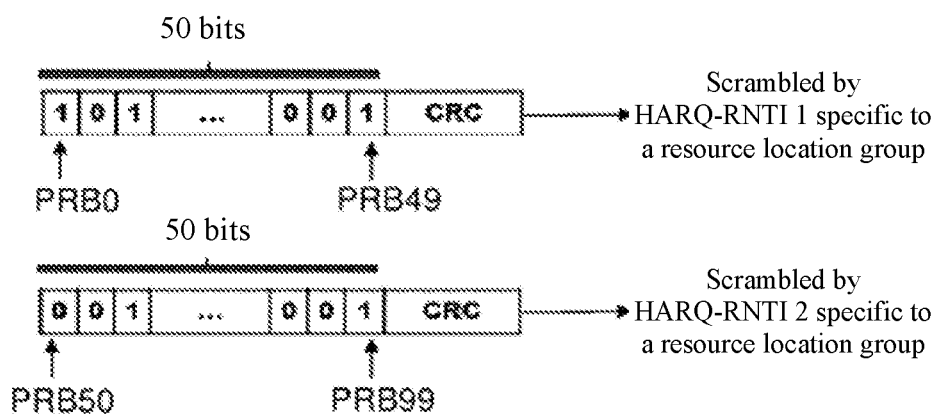
FIG. 6 is a schematic diagram illustrating a second example of a DCI format of scheme 2 according to the first embodiment of the present invention.

FIG. 6 shows a second implementation mode of scheme 2, where HARQ-ACK feedback is also performed with two pieces of downlink control information. As shown in FIG. 6, PRB0 to PRB49 are grouped into PRB group 0, and PRB50 to PRB99 are grouped into PRB group 1. Different from the first implementation mode shown in FIG. 5, in FIG. 6, different resource location groups are not differentiated by setting special resource location group identifiers; in contrast, the two pieces of DCI are scrambled by different fixed scrambling identifiers (i.e., HARQ-RNTIs specific to resource location groups) rather than a fixed scrambling identifier, to further differentiate different resource location groups.

In the case shown in FIG. 6, the step of generating at least one piece of downlink control information further includes: scrambling a cyclic redundancy check according to scrambling identifiers specific to resource location groups (HARQ-RNTIs), for identifying that the downlink control information is information for feeding back corresponding HARQ-ACKs to the plurality of user equipments, and identifying resource location groups corresponding to the downlink control information.

Similarly, FIG. 6 only shows a case of two pieces of DCI. However, those skilled in the art should understand that the present invention is not only limited thereto. For example, the present invention may be further applied to a case of more pieces of DCI (for example, 4 pieces of DCI). Of course, accordingly, in the case of 4 pieces of DCI, CRCs in the 4 pieces of DCI are respectively scrambled by four different HARQ-RNTIs, to differentiate four PRB groups.

In addition, the case where one information bit of the DCI corresponds to one PRB index or PRB group index is described in scheme 1. However, those skilled in the art may understand that, in the plurality of pieces of DCI in scheme 2, there may also be the case where one information bit of the DCI corresponds to a PRB index or a PRB group index.

Second Embodiment

In this second embodiment, the implicit mapping is performed based on an Enhanced Control Channel Element (ECCE) index for uplink shared channel transmission allocated by a base station to a user equipment.

In addition to that the implicit mapping relationship is established between the user equipment and one or more information bits of the DCI, based on resource locations for uplink data transmission allocated by the base station to the user equipment as described above in the first embodiment. Alternatively, in the second embodiment, an implicit mapping relationship may further exist between the user equipment and one or more information bits of the downlink control information, based on the Enhanced Control Channel Element (ECCE) index for uplink shared channel transmission allocated by the base station to the user equipment.

Figure 7:
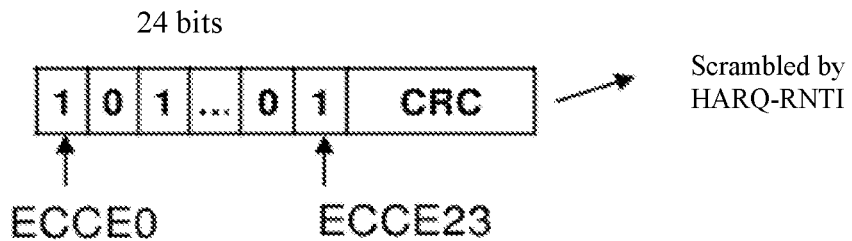
FIG. 7 is a schematic diagram illustrating a DCI format according to a second embodiment of the present invention.

FIG. 7 shows a schematic diagram of a DCI format according to the second embodiment of the present invention. As shown in FIG. 7, a piece of DCI including 24 information bits is shown. However, those skilled in the art should understand that the present invention is not only limited thereto. Since there are 24 ECCE indexes, the case where the DCI includes 24 information bits is merely an example, and the present invention is not only limited thereto. In the second embodiment, data information of the DCI for HARQ-ACK may further include other number of bits that is less than 24, or greater than 24.

As shown in FIG. 7, in the DCI, a first bit corresponds to ECCE 0, a second bit corresponds to ECCE 1, . . . , and a 24$^{th}$ bit corresponds to ECCE 23. FIG. 7 shows a case where each of the 24 bits corresponds to one ECCE index. However, those skilled in the art should understand that the present invention is not only limited thereto. For example, in a case where there are fewer user equipments, only a portion of the 24 bits may be used to correspond to corresponding ECCE indexes.

Of course, it is enumerated above that the implicit mapping relationship is established between the user equipment and one or more information bits of the DCI, based on the PRB index and the ECCE index. However, those skilled in the art should understand that the present invention is not only limited thereto. Any other information that can uniquely correspond to the user equipment may also be similarly applied to the present invention, and should be included in the scope of the present invention.

(II) HARQ-ACK Extraction Method on User Equipment Side

Figure 8:
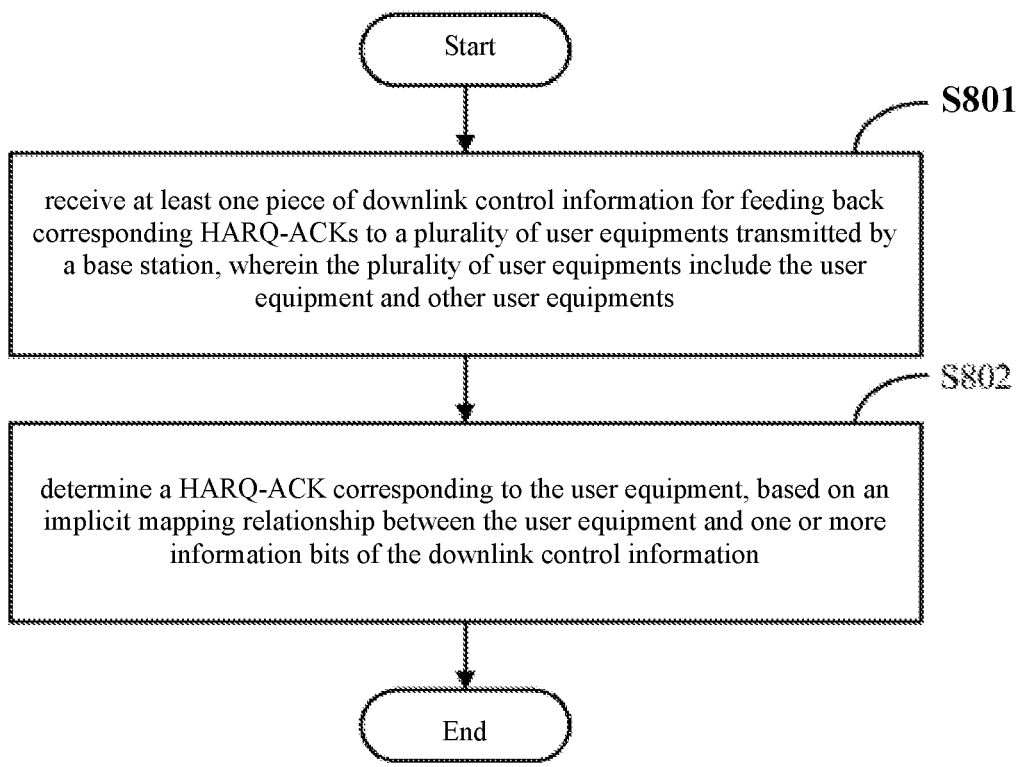
FIG. 8 is a flow chart of a procedure of a Hybrid Automatic Repeat reQuest ACKnowledgement (HARQ-ACK) extraction method performed by a user equipment according to the present invention.

Next, as a counterpart of the Hybrid Automatic Repeat reQuest ACKnowledgement (HARQ-ACK) feedback method performed by a base station, a Hybrid Automatic Repeat reQuest ACKnowledgement (HARQ-ACK) extraction method performed by a user equipment will be described with reference to FIG. 8. As shown in FIG. 8, the method comprises steps below.

Firstly, in step S801, at least one piece of downlink control information for feeding back corresponding HARQ-ACKs to a plurality of user equipments transmitted by a base station is received, where the plurality of user equipments include the user equipment and other user equipments.

Then, in step S802, a HARQ-ACK corresponding to the user equipment is determined, based on an implicit mapping relationship between the user equipment and one or more information bits of the downlink control information.

Hereinafter, descriptions of various specific implementation modes will be given in aspects such as: based on what type of data to perform the implicit mapping, a corresponding relationship between the information bits of the DCI and resource locations in the implicit mapping, and how to perform HARQ-ACK extraction based on such corresponding relationship.

First Embodiment

In this first embodiment, the implicit mapping is performed based on resource locations for uplink data transmission allocated by a base station to a user equipment.

As a preferred implementation mode, the implicit relationship is an implicit mapping relationship established between the user equipment and the one or more information bits of the downlink control information, based on resource locations for uplink data transmission allocated by the base station to the user equipment.

In this case, the step of determining the HARQ-ACK corresponding to the user equipment includes: determining one or more information bits of the downlink control information that correspond to the user equipment, based on resource locations for uplink data transmission allocated by the base station to the user equipment, so as to extract the HARQ-ACK corresponding to the user equipment.

(1) Scheme 1: HARQ-ACK Feedback Performed with One Piece of DCI

In scheme 1, the at least one piece of downlink control information refers to one piece of downlink control information. As described above with reference to FIG. 3, HARQ-ACK feedback to the plurality of user equipments is performed with one piece of DCI. The resource locations for uplink data transmission allocated by the base station to the user equipment may be a single PRB, a plurality of PRBs, or may also be one group of PRBs or a plurality of groups of PRBs. For example, the one group of PRBs may be 1 Narrow Band (NB), that is, 6 PRBs, or may also be 3 PRBs predefined. In a case where the base station allocates to the user equipment a single PRB, an implicit mapping relationship exists between the user equipment and one information bit of the DCI. However, in a case where the base station allocates to the user equipment a plurality of PRBs or a plurality of groups of PRBs, an implicit mapping relationship exists between the user equipment and a plurality of information bits of the DCI; or, in a case where the base station allocates to the user equipment a plurality of PRBs, one group of PRBs, or a plurality of groups of PRBs, an implicit mapping relationship may also exist between the user equipment and one information bit of the DCI.

In the case where the base station allocates to the user equipment a single PRB, an implicit mapping relationship exists between the user equipment and one information bit of the DCI. In this case, the step of determining the HARQ-ACK corresponding to the user equipment may include: determining one corresponding information bit of uplink control information, based on a resource location for uplink data transmission of the user equipment that is allocated by the base station, and extracting a value of the information bit as the HARQ-ACK. For example, if a PRB index for the user equipment is 50, the user equipment will read a $51^{st}$ bit of the DCI. If a value of the $51^{st}$ bit of the DCI is 1, it means ACK, that is, it is no longer necessary to continue to transmit uplink data. On the other hand, if the value of the $51^{st}$ bit of the DCI is 0, it means NACK, that is, it is still necessary to continue to transmit uplink data.

In the case where the base station allocates to the user equipment a plurality of PRBs, an implicit mapping relationship exists between the user equipment and a plurality of information bits of the DCI. In this case, the step of determining the HARQ-ACK corresponding to the user equipment may include: determining a plurality of corresponding information bits of the uplink control information, based on a resource location for uplink data transmission of the user equipment that is allocated by the base station. As long as a value of one of the plurality of information bits is 1, it means ACK, that is, it is no longer necessary to continue to transmit uplink data. However, if values of all the bits in the plurality of information bits are 0, it means NACK, that is, it still necessary to continue to transmit uplink data.

Alternatively, in the case where the base station allocates to the user equipment a plurality of PRBs, an implicit mapping relationship may also exist between the user equipment and one information bit of the DCI, that is, an implicit mapping relationship exists between the user equipment and one information bit of the DCI, based on a starting PRB index of the allocated group of PRBs. In this case, the step of determining the HARQ-ACK corresponding to the user equipment may include: determining one corresponding information bit of the uplink control information, based on a starting PRB index for the user equipment that is allocated by the base station. If a value of the information bit is 1, it means ACK, that is, it is no longer necessary to continue to transmit uplink data. However, if the value of the information bit is 0, it means NACK, that is, it still necessary to continue to transmit uplink data.

In the case where the base station allocates to the user equipment a group of PRBs, an implicit mapping relationship exists between the user equipment and one information bit of the DCI. In this case, the step of determining the HARQ-ACK corresponding to the user equipment may include: determining one corresponding information bit of the uplink control information, based on a PRB group index for the user equipment that is allocated by the base station. If a value of the information bit is 1, it means ACK, that is, it is no longer necessary to continue to transmit uplink data. However, if the value of the information bit is 0, it means NACK, that is, it still necessary to continue to transmit uplink data.

Moreover, in FIG. 3, one information bit of the DCI corresponds to one PRB (i.e., a single resource location).

In addition, as described above with reference to FIG. 4, HARQ-ACK feedback to the plurality of user equipments is performed with one piece of DCI. The difference is that, in FIG. 4, one information bit of the DCI corresponds to a group of PRBs (i.e., one resource location group). A group of PRBs (for example, NB0) corresponding to one information bit of the DCI may be only used by a same user, or may also be used by a plurality of users.

When a group of PRBs corresponding to one information bit of the DCI is allocated to only one user for use, the information bit carries a value indicating the HARQ-ACK for the user equipment. In this case, the step of determining the HARQ-ACK corresponding to the user equipment may include: determining a resource location group corresponding to the user equipment, based on the resource location for uplink data transmission of the user equipment that is allocated by the base station, determining one corresponding information bit of the uplink control information based on the resource location group, and extracting a value of the information bit as the HARQ-ACK.

In a case where a group of PRBs corresponding to one information bit of the DCI is allocated to a plurality of users for use, a pre-grouped PRB group may be mapped to one information bit of the DCI regardless of whether HARQ-ACK values of the plurality of user equipments corresponding to the respective PRBs in the PRB group are the same. It is described with a case where the PRB group includes three user equipments as an example. If values of HARQ-ACK corresponding to the three user equipments are all 1, a value of the one information bit of the DCI is set to 1. If the values of the HARQ-ACK information corresponding to the three user equipments are not all 1, that is, at least one of the values of the HARQ-ACK corresponding to the three user equipments is 0, the value of the one information bit of the DCI is set to 0. That is, in this case, as long as there is a user equipment whose HARQ-ACK value is 0 among the plurality of different user equipments, the information bit of the DCI corresponding to the plurality of different user equipments has a value of 0. In this case, the step of determining the HARQ-ACK corresponding to the user equipment may include: determining a resource location group corresponding to the user equipment, based on the resource location for uplink data transmission of the user equipment that is allocated by the base station, determining one corresponding information bit of the uplink control information based on the resource location group, and extracting a value of the information bit as the HARQ-ACK.

Each piece of downlink control information includes a cyclic redundancy check scrambled according to a fixed scrambling identifier (HARQ-RNTI), for identifying that the downlink control information is information for feeding back corresponding HARQ-ACK to the user equipment. The user equipment firstly determines the downlink control information scrambled by the HARQ-RNTI, and further extracts a specific information bit value as the HARQ-ACK.

(2) Scheme 2: HARQ-ACK Feedback Performed with a Plurality of Pieces of DCI

In scheme 2, the at least one piece of downlink control information refers to a plurality of pieces of downlink control information, and the plurality of pieces of downlink control information respectively correspond to different resource location groups.

As described above with reference to FIG. 5, in the first implementation mode, HARQ-ACK feedback is performed with two pieces of downlink control information. Each piece of downlink control information includes a cyclic redundancy check scrambled according to a fixed scrambling identifier (HARQ-RNTI), for identifying that the downlink control information is information for feeding back corresponding HARQ-ACK to the user equipment, and the different resource location groups are identified by resource location group identifiers in the downlink control information.

In this case, the determining the HARQ-ACK corresponding to the user equipment includes: determining, based on the resource location for the user equipment, a resource location group identifier corresponding thereto; and determining, based on the resource location group identifier, downlink control information corresponding to the user equipment, and determining a corresponding information bit in the corresponding downlink control information.

In addition, as described above with reference to FIG. 6, in the second implementation mode, HARQ-ACK feedback is performed with two pieces of downlink control information. Different from the first implementation mode, in FIG. 6, different resource location groups are not differentiated by setting special resource location group identifiers; in contrast, the two pieces of DCI are scrambled by different fixed scrambling identifiers (i.e., HARQ-RNTIs specific to resource location group) rather than a fixed scrambling identifier, to further differentiate different resource location groups. In this case, each piece of the downlink control information includes a cyclic redundancy check scrambled according to scrambling identifiers specific to resource location groups (HARQ-RNTI), for identifying that the downlink control information is information for feeding back corresponding HARQ-ACK to the user equipment, and the different resource location groups are identified by the scrambling identifiers specific to the resource location groups.

In this case, the determining the HARQ-ACK corresponding to the user equipment includes: determining, based on the resource location for the user equipment, a scrambling identifier specific to a resource location group to which the user equipment belongs; checking each piece of downlink control information, by employing the determined scrambling identifier and the scrambled cyclic redundancy check. If the check is passed, it is determined that the downlink control information corresponds to the resource location group to which the user equipment belongs, and a corresponding information bit of the corresponding downlink control information is further determined based on the resource location for the user equipment.

In addition, the case where one information bit of the DCI corresponds to a PRB index or a PRB group index is described in scheme 1. However, those skilled in the art may understand that, in the plurality of pieces of DCI in scheme 2, there may also be the case where one information bit of the DCI corresponds to a PRB index or a PRB group index.

Second Embodiment

In this second embodiment, the implicit mapping is performed based on an Enhanced Control Channel Element ECCE index for uplink shared channel transmission allocated by a base station to a user equipment.

In addition to that the implicit mapping relationship is established between the user equipment and one or more information bits of the DCI, based on resource locations for uplink data transmission allocated by the base station to the user equipment as described above in the first embodiment. Alternatively, as described above with reference to FIG. 7, in the second embodiment, the implicit relationship is an implicit mapping relationship established between the user equipment and one or more information bits of the downlink control information, based on the Enhanced Control Channel Element ECCE index for uplink shared channel transmission allocated by the base station to the user equipment.

For example, in the DCI for resource allocation transmitted by the base station to the user equipment, the CRC is scrambled by the C-RNTI. The user equipment may determine that the DCI is the DCI for resource allocation by descrambling the CRC scrambled by the C-RNTI. Thereafter, the user equipment may determine an ECCE index corresponding to the user equipment, by reading data information of the DCI for resource allocation. In the second embodiment, the ECCE index is employed to establish an implicit mapping relationship between the user equipment and the one or more information bits of the downlink control information.

In this case, the determining the HARQ-ACK corresponding to the user equipment includes: determining the one or more information bits of the downlink control information that correspond to the user equipment, based on the Enhanced Control Channel Element ECCE index for uplink shared channel transmission allocated by the base station to the user equipment, so as to extract HARQ-ACK corresponding to the user equipment.

Of course, it is enumerated above that the implicit mapping relationship is established between the user equipment and one or more information bits of the DCI, based on the PRB index and the ECCE index. However, those skilled in the art should understand that the present invention is not only limited thereto. Any other information that can uniquely correspond to the user equipment may also be similarly applied to the present invention, and should be included in the scope of the present invention.

(III) Base Station

Hereinafter, a specific configuration of the base station corresponding to the Hybrid Automatic Repeat reQuest ACKnowledgement (HARQ-ACK) feedback method performed by the base station according to the present invention described in Part (I) above will be described with reference to FIG. 9. The base station according to the present invention is configured to perform Hybrid Automatic Repeat reQuest ACKnowledgement (HARQ-ACK) feedback to a plurality of user equipments.

Figure 9:
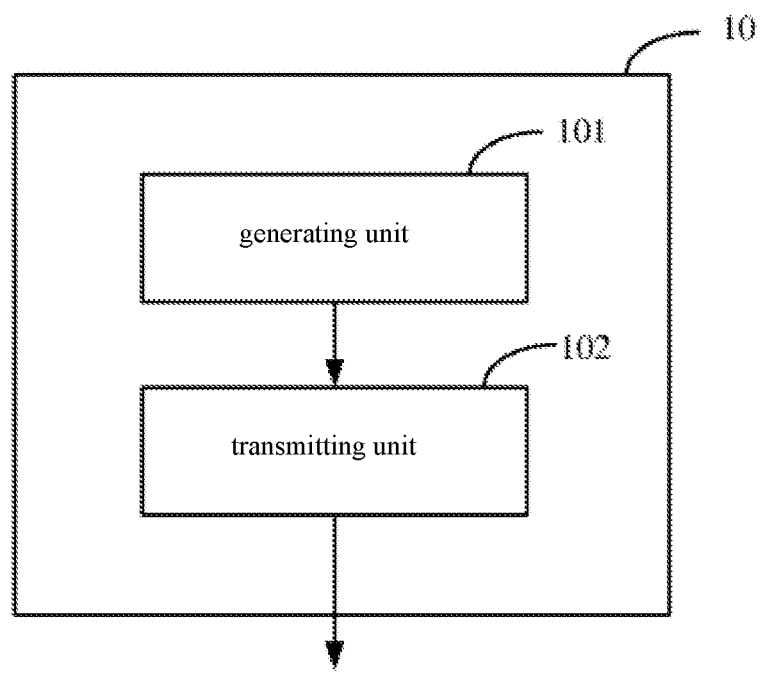
FIG. 9 is a functional block diagram illustrating a configuration of a base station according to the present invention.

As shown in FIG. 9, the base station 10 comprises: a generating unit 101 and a transmitting unit 102.

The generating unit 101 generates, by employing a plurality of pieces of HARQ-ACK information corresponding to the plurality of user equipments, at least one piece of downlink control information, where for each user equipment, an implicit mapping relationship exists between the user equipment and one or more information bits of the downlink control information.

The transmitting unit 102 transmits to the plurality of user equipments the downlink control information.

In the present invention, an implicit mapping relationship is established between the plurality of user equipments and information bits of the downlink control information, so that each of the user equipments can autonomously determine corresponding HARQ-ACK in the downlink control information, without DL signaling to notify the user equipments one by one of the information bits of the HARQ-ACKs corresponding to the respective user equipments in the downlink control information for HARQ-ACK feedback. Therefore, DL signaling overhead is significantly reduced as compared with the prior art.

Hereinafter, descriptions of various specific implementation modes will be given in aspects such as: based on what type of data to perform the implicit mapping, and a corresponding relationship between the information bits of the DCI and resource locations in the implicit mapping.

First Embodiment

In this first embodiment, the implicit mapping is performed based on resource locations for uplink data transmission allocated by a base station to a user equipment.

In the first embodiment, the base station may further comprise: an allocating unit (not shown), configured to allocate a resource location for uplink data transmission to each of the plurality of equipments.

In this case, the generating unit 101 is further configured to: for each user equipment, establish an implicit mapping relationship between the user equipment and one or more information bits of the downlink control information, based on a resource location for uplink data transmission allocated by the allocating unit to the user equipment.

(1) Scheme 1: HARQ-ACK Feedback Performed with One Piece of DCI

In scheme 1, the at least one piece of downlink control information refers to one piece of downlink control information.

As described above with reference to FIG. 3, HARQ-ACK feedback to the plurality of user equipments is performed with one piece of DCI. Data information of the DCI for the HARQ-ACKs may include 100 information bits, but may also include the number of information bits that is less than 100, or greater than 100. Each information bit of the DCI may correspond to one PRB index, respectively; and of course, there may also be only a portion of the information bits corresponding to corresponding PRB indexes. The resource locations for uplink data transmission allocated by the base station to the user equipment may be a single PRB, a plurality of PRBs, or may also be one group of PRBs or a plurality of groups of PRBs. For example, the one group of PRBs may be 1 Narrow Band (NB), that is, 6 PRBs, or may also be 3 PRBs predefined. In a case where the base station allocates to the user equipment a single PRB, an implicit mapping relationship exists between the user equipment and one information bit of the DCI. However, in a case where the base station allocates to the user equipment a plurality of PRBs or a plurality of groups of PRBs, an implicit mapping relationship exists between the user equipment and a plurality of information bits of the DCI. Alternatively, in a case where the base station allocates to the user equipment a plurality of PRBs, one group of PRBs, or a plurality of groups of PRBs, an implicit mapping relationship may also exist between the user equipment and one information bit of the DCI. That is, an implicit mapping relationship may exist between the user equipment and one information bit of the DCI, based on a starting PRB index, a PRB group index, or a starting PRB group index of the allocated group of PRBs.

Although FIG. 3 shows a case where one information bit of the DCI corresponds to one PRB (i.e., a single resource location). However, the present invention is not only limited thereto.

As described above with reference to FIG. 4, one information bit of the DCI corresponds to a group of PRBs (i.e., one resource location group). A group of PRBs (for example, NB0) corresponding to one information bit of the DCI may be PRBs allocated by the base station to a same user equipment, or may also be PRBs allocated by the base station to a plurality of different user equipments. In a case where a group of PRBs corresponding to one information bit of the DCI are PRBs allocated by the base station to a same user equipment, the information bit carries a value indicating the HARQ-ACK for the user equipment. In a case where a group of PRBs corresponding to one information bit of the DCI are PRBs allocated by the base station to a plurality of different user equipments, PRBs for a plurality of user equipments having a same HARQ-ACK value that are allocated by the base station may be all mapped to one information bit of the DCI. Alternatively, in the case where a group of PRBs corresponding to one information bit of the DCI are PRBs allocated by the base station to a plurality of different user equipments, a pre-grouped PRB group may be mapped to one information bit of the DCI regardless of whether HARQ-ACK values of the plurality of user equipments corresponding to the respective PRBs in the PRB group are the same. In this case, as long as there is a user equipment whose HARQ-ACK is NACK among the plurality of different user equipments, the information bit of the DCI corresponding to the plurality of different user equipments has a value of 0.

The generating unit 101 further includes: a scrambling unit (not shown), configured to scramble a cyclic redundancy check according to a fixed scrambling identifier (HARQ-RNTI), for identifying that the downlink control information is information for feeding back corresponding HARQ-ACKs to the plurality of user equipments. The user equipment firstly determines the downlink control information scrambled by the HARQ-RNTI, and further extracts a specific information bit value as the HARQ-ACK.

In a communication process between the base station and the user equipment, there are various types of DCI such as DCI for resource allocation, and DCI for HARQ-ACK feedback. Here, at the base station side, by scrambling the CRC with the HARQ-RNTI, the user equipment side can descramble the CRC, so as to identify that the DCI is the DCI for HARQ-ACK feedback. The fixed scrambling identifier may be a conventionally defined value or a newly defined value, as long as the value is fixed.

(2) Scheme 2: HARQ-ACK Feedback Performed with a Plurality of Pieces of DCI

In scheme 2, the at least one piece of downlink control information refers to a plurality of pieces of downlink control information, and the plurality of pieces of downlink control information respectively correspond to different resource location groups.

As described above with reference to FIG. 5, in the first implementation mode of scheme 2, HARQ-ACK feedback is performed with two pieces of downlink control information. As shown in FIG. 5, PRB0 to PRB49 are grouped into PRB group 0, and PRB50 to PRB99 are grouped into PRB group 1. A resource location group identifier corresponding to PRB group 0 is 1, and a resource location group identifier corresponding to PRB group 1 is 0.

In the case shown in FIG. 5, the generating unit 101 further includes: a scrambling unit (not shown), configured to scramble a cyclic redundancy check according to a fixed scrambling identifier (HARQ-RNTI), for identifying that the downlink control information is information for feeding back corresponding HARQ-ACKs to the plurality of user equipments; and a resource location group identifier setting unit (not shown), configured to set a resource location group identifier in the downlink control information, for identifying a resource location group corresponding to the piece of downlink control information.

As described above with reference to FIG. 6, in the second implementation mode of scheme 2, HARQ-ACK feedback is performed with two pieces of downlink control information. Different from the first implementation mode, in FIG. 6, different resource location groups are not differentiated by setting special resource location group identifiers; but in contrast, the two pieces of DCI are scrambled by different fixed scrambling identifiers (i.e., HARQ-RNTIs specific to resource location groups) rather than a fixed scrambling identifier, to further differentiate different resource location groups.

In the case shown in FIG. 6, the generating unit 101 further includes: a scrambling unit (not shown), configured to scramble a cyclic redundancy check according to scrambling identifiers specific to resource location groups, for identifying that the downlink control information is information for feeding back corresponding HARQ-ACKs to the plurality of user equipments, and identifying the resource location groups corresponding to the downlink control information.

In addition, the case where one information bit of the DCI corresponds to a PRB index or a PRB group index is described in scheme 1. However, those skilled in the art may understand that, in the plurality of DCI in scheme 2, there may also be the case where one information bit of the DCI corresponds to a PRB index or a PRB group index.

Second Embodiment

In addition to that the implicit mapping relationship is established between the user equipment and one or more information bits of the DCI, based on resource locations for uplink data transmission allocated by the base station to the user equipment as described in the first embodiment. Alternatively, in the second embodiment, an implicit mapping relationship may also exist between each of the user equipments and one or more information bits of the downlink control information, based on the Enhanced Control Channel Element ECCE index for uplink shared channel transmission allocated by the base station to the user equipment.

As described above with reference to FIG. 7, the DCI may include 24 information bits. Of course, the present invention is not only limited thereto. The DCI may further include other numbers of information bits.

In the second embodiment, the base station 10 may further comprise: an allocating unit (not shown), configured to allocate an enhanced control channel element ECCE index for uplink shared channel transmission to each of the plurality of devices.

In this case, the generating unit 101 is further configured to: for each user equipment, establish an implicit mapping relationship between the user equipment and the one or more information bits of the downlink control information, based on the enhanced control channel element ECCE index for uplink shared channel transmission allocated by the allocating unit to the user equipment.

Of course, it is enumerated above that the implicit mapping relationship is established between the user equipment and one or more information bits of the DCI, based on the PRB index and the ECCE index. However, those skilled in the art should understand that the present invention is not only limited thereto. Any other information that can uniquely correspond to the user equipment may also be similarly applied to the present invention, and should be included in the scope of the present invention.

(IV) User Equipment

Finally, a specific configuration of the user equipment corresponding to the Hybrid Automatic Repeat reQuest ACKnowledgement (HARQ-ACK) extraction method performed by the user equipment described above will be described with reference to FIG. 10. The user equipment according to the present invention is configured to perform extraction of Hybrid Automatic Repeat reQuest ACKnowledgement (HARQ-ACK) from a base station.

Figure 10:
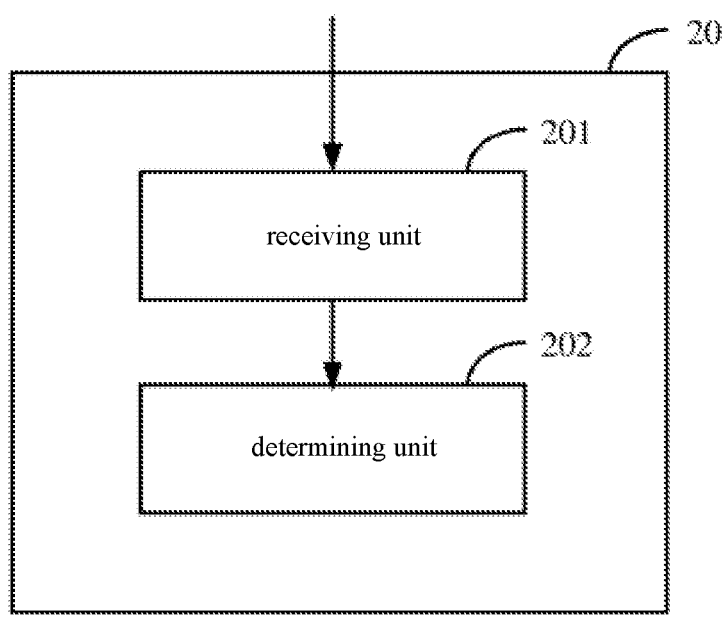
FIG. 10 is a functional block diagram illustrating a configuration of a user equipment according to the present invention.

As shown in FIG. 10, the user equipment 20 comprises: a receiving unit 201 and a determining unit 202.

The receiving unit 201 receives at least one piece of downlink control information for feeding back corresponding HARQ-ACKs to a plurality of user equipments transmitted by the base station, where the plurality of user equipments include the user equipment and other user equipments.

The determining unit 202 determines a HARQ-ACK corresponding to the user equipment, based on an implicit mapping relationship between the user equipment and one or more information bits of the downlink control information.

Hereinafter, descriptions of various specific implementation modes will be given in aspects such as: based on what type of data to perform the implicit mapping, a corresponding relationship between the information bits of the DCI and resource locations in the implicit mapping, and how to perform HARQ-ACK extraction based on such corresponding relationship.

First Embodiment

As a preferred implementation mode, the implicit mapping relationship is an implicit mapping relationship established between the user equipment and the one or more information bits of the downlink control information, based on resource locations for uplink data transmission allocated by the base station to the user equipment.

In this case, the determining unit 202 is further configured to: determine the one or more information bits of the downlink control information that correspond to the user equipment, based on resource locations for uplink data transmission allocated by the base station to the user equipment, so as to extract the HARQ-ACK corresponding to the user equipment.

(1) Scheme 1: HARQ-ACK Feedback Performed with One Piece of DCI

In scheme 1, the at least one piece of downlink control information refers to one piece of downlink control information. As described above with reference to FIG. 3, HARQ-ACK feedback to the plurality of user equipments is performed with one piece of DCI. The resource locations for uplink data transmission allocated by the base station to the user equipment may be a single PRB, a plurality of PRBs, or may also be one group of PRBs or a plurality of groups of PRBs. For example, the one group of PRBs may be 1 Narrow Band (NB), that is, 6 PRBs, or may also be 3 PRBs predefined.

In the case where the base station allocates to the user equipment a single PRB, an implicit mapping relationship exists between the user equipment and one information bit of the DCI. In this case, the determining unit 202 may be configured to: determine one corresponding information bit of uplink control information, based on a resource location for uplink data transmission of the user equipment that is allocated by the base station, and extract a value of the information bit as HARQ-ACK. For example, if a PRB index for the user equipment is 50, the user equipment will read a $51^{st}$ bit of the DCI. If a value of the $51^{st}$ bit of the DCI is 1, it means ACK, that is, it is no longer necessary to continue to transmit uplink data. On the other hand, if the value of the $51^{st}$ bit of the DCI is 0, it means NACK, that is, it is still necessary to continue to transmit uplink data.

In the case where the base station allocates to the user equipment a plurality of PRBs, an implicit mapping relationship exists between the user equipment and a plurality of information bits of the DCI. In this case, the determining unit 202 may be configured to: determine a plurality of corresponding information bits of the uplink control information, based on the resource location for uplink data transmission of the user equipment that is allocated by the base station. As long as a value of one of the plurality of information bits is 1, it means ACK, that is, it is no longer necessary to continue to transmit uplink data. However, if values of all the bits in the plurality of information bits are 0, it means NACK, that is, it is still necessary to continue to transmit uplink data.

Alternatively, in the case where the base station allocates to the user equipment a plurality of PRBs, an implicit mapping relationship may also exist between the user equipment and one information bit of the DCI, that is, an implicit mapping relationship exists between the user equipment and one information bit of the DCI, based on a starting PRB index of the allocated group of PRBs. In this case, the determining unit 202 may be configured to: determine one corresponding information bit of the uplink control information, based on a starting PRB index for the user equipment that is allocated by the base station. If a value of the information bit is 1, it means ACK, that is, it is no longer necessary to continue to transmit uplink data. However, if the value of the information bit is 0, it means NACK, that is, it still necessary to continue to transmit uplink data.

In the case where the base station allocates to the user equipment a group of PRBs, an implicit mapping relationship may also exist between the user equipment and one information bit of the DCI, that is, an implicit mapping relationship exists between the user equipment and one information bit of the DCI, based on the PRB group index of the allocated group of PRBs. In this case, the determining unit 202 may be configured to: determine one corresponding information bit of the uplink control information, based on a starting PRB index for the user equipment that is allocated by the base station. If a value of the information bit is 1, it means ACK, that is, it is no longer necessary to continue to transmit uplink data. However, if the value of the information bit is 0, it means NACK, that is, it still necessary to continue to transmit uplink data.

Moreover, in FIG. 3, one information bit of the DCI corresponds to one PRB (i.e., a single resource location).

In addition, as described above with reference to FIG. 4, HARQ-ACK feedback to the plurality of user equipments is performed with one piece of DCI. The difference is that, in FIG. 4, one information bit of the DCI corresponds to a group of PRBs (i.e., one resource location group). A group of PRBs (for example, NB0) corresponding to one information bit of the DCI may be PRBs allocated by the base station to a same user equipment, or may also be PRBs allocated by the base station to a plurality of different user equipments.

In a case where a group of PRBs corresponding to one information bit of the DCI is PRBs allocated by the base station to a same user equipment, the information bit carries a value indicating the HARQ-ACK for the user equipment. In this case, the determining unit 202 may be configured to: determine a resource location group corresponding to the user equipment, based on the resource location for uplink data transmission of the user equipment that is allocated by the base station, determine one corresponding information bit of the uplink control information based on the resource location group, and extract a value of the information bit as the HARQ-ACK.

In a case where a group of PRBs corresponding to one information bit of the DCI is PRBs allocated by the base station to a plurality of different user equipments, PRBs of a plurality of user equipments having a same HARQ-ACK value that are allocated by the base station may be all mapped to one information bit of the DCI. In this case, the determining unit 202 may be configured to: determine a resource location group corresponding to the user equipment, based on the resource location for uplink data transmission of the user equipment that is allocated by the base station, determine one corresponding information bit of the uplink control information based on the resource location group, and extract a value of the information bit as the HARQ-ACK.

Alternatively, in the case where a group of PRBs corresponding to one information bit of the DCI are PRBs allocated by the base station to a plurality of different user equipments, a pre-grouped PRB group may be mapped to one information bit of the DCI regardless of whether HARQ-ACK values of the plurality of user equipments corresponding to the respective PRBs in the PRB group are the same. In this case, as long as there is a user equipment whose HARQ-ACK is NACK among the plurality of different user equipments, the information bit of the DCI corresponding to the plurality of different user equipments has a value of 0. In this case, the determining unit 202 may be configured to: determine a resource location group corresponding to the user equipment, based on the resource location for uplink data transmission of the user equipment that is allocated by the base station, determine one corresponding information bit of the uplink control information based on the resource location group, and extract a value of the information bit as the HARQ-ACK.

Each piece of downlink control information includes a cyclic redundancy check scrambled according to a fixed scrambling identifier (HARQ-RNTI), for identifying that the downlink control information is information for feeding back corresponding HARQ-ACK to the user equipment. The user equipment firstly determines the downlink control information scrambled by the HARQ-RNTI, and further extracts a specific information bit value as the HARQ-ACK.

(2) Scheme 2: HARQ-ACK Feedback Performed with a Plurality of Pieces of DCI

In scheme 2, the at least one piece of downlink control information refers to a plurality of pieces of downlink control information, and the plurality of pieces of downlink control information respectively correspond to different resource location groups.

As described above with reference to FIG. 5, in the first implementation mode, HARQ-ACK feedback is performed with two pieces of downlink control information. Each piece of downlink control information includes a cyclic redundancy check scrambled according to a fixed scrambling identifier (HARQ-RNTI), for identifying that the downlink control information is information for feeding back corresponding HARQ-ACK to the user equipment, and the different resource location groups are identified by resource location group identifiers in the downlink control information.

In this case, the determining unit 202 is further configured to: determine, based on the resource location for the user equipment, a resource location group identifier corresponding thereto; and determine, based on the resource location group identifier, downlink control information corresponding to the user equipment, and determine a corresponding information bit in the corresponding downlink control information.

In addition, as described above with reference to FIG. 6, in the second implementation mode, HARQ-ACK feedback is performed with two pieces of downlink control information. Different from the first implementation mode, in FIG. 6, different resource location groups are not differentiated by setting special resource location group identifiers in contrast, the two pieces of DCI are scrambled by different fixed scrambling identifiers (i.e., HARQ-RNTIs specific to resource location group) rather than a fixed scrambling identifier, to further differentiate different resource location groups. In this case, each piece of the downlink control information includes a cyclic redundancy check scrambled according to scrambling identifiers specific to resource location groups (HARQ-RNTIs), for identifying that the downlink control information is information for feeding back corresponding HARQ-ACK to the user equipment, and the different resource location groups are identified by the scrambling identifiers specific to the resource location groups.

In this case, the determining unit 202 is further configured to: determine, based on the resource location for the user equipment, a scrambling identifier specific to a resource location group to which the user equipment belongs; check each piece of downlink control information, by employing the determined scrambling identifier and the scrambled cyclic redundancy check. if the check is passed, it is determined that the downlink control information corresponds to the resource location group to which the user equipment belongs, and corresponding information bit of the corresponding downlink control information is further determined based on the resource location for the user equipment.

In addition, the case where one information bit of the DCI corresponds to a PRB index or a PRB group index is described in scheme 1. However, those skilled in the art may understand that, in the plurality of pieces of DCI in scheme 2, there may also be the case where one information bit of the DCI corresponds to a PRB index or a PRB group index.

Second Embodiment

In addition to that the implicit mapping relationship is established between the user equipment and one or more information bits of the DCI, based on resource locations for uplink data transmission allocated by the base station to the user equipment as described above in the first embodiment. Alternatively, as described above with reference to FIG. 7, in the second embodiment, the implicit relationship is an implicit mapping relationship established between the user equipment and one or more information bits of the downlink control information, based on the Enhanced Control Channel Element ECCE index for uplink shared channel transmission allocated by the base station to the user equipment.

For example, in the DCI for resource allocation transmitted by the base station to the user equipment, the CRC is scrambled by the C-RNTI. The user equipment may determine that the DCI is the DCI for resource allocation by descrambling the CRC scrambled by the C-RNTI. Thereafter, the user equipment may determine an ECCE index corresponding to the user equipment, by reading data information of the DCI for resource allocation. In the second embodiment, the ECCE index is employed to establish an implicit mapping relationship between the user equipment and the one or more information bits of the downlink control information.

In this case, the determining unit is further configured to: determine the one or more information bits of the downlink control information that correspond to the user equipment, based on the Enhanced Control Channel Element ECCE index for uplink shared channel transmission allocated by the base station to the user equipment, so as to extract HARQ-ACK corresponding to the user equipment.

Of course, it is enumerated above that the implicit mapping relationship is established between the user equipment and one or more information bits of the DCI, based on the PRB index and the ECCE index. However, those skilled in the art should understand that the present invention is not only limited thereto. Any other information that can uniquely correspond to the user equipment may also be similarly applied to the present invention, and should be included in the scope of the present invention.

(V) Hardware Structure

It should be noted that block diagrams used for the illustration of the above embodiments represent functional blocks in functional units. These functional blocks (components) are realized by any combination of hardware and/or software. In addition, the means for implementing respective function blocks is not particularly limited. That is, respective functional blocks may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 11:
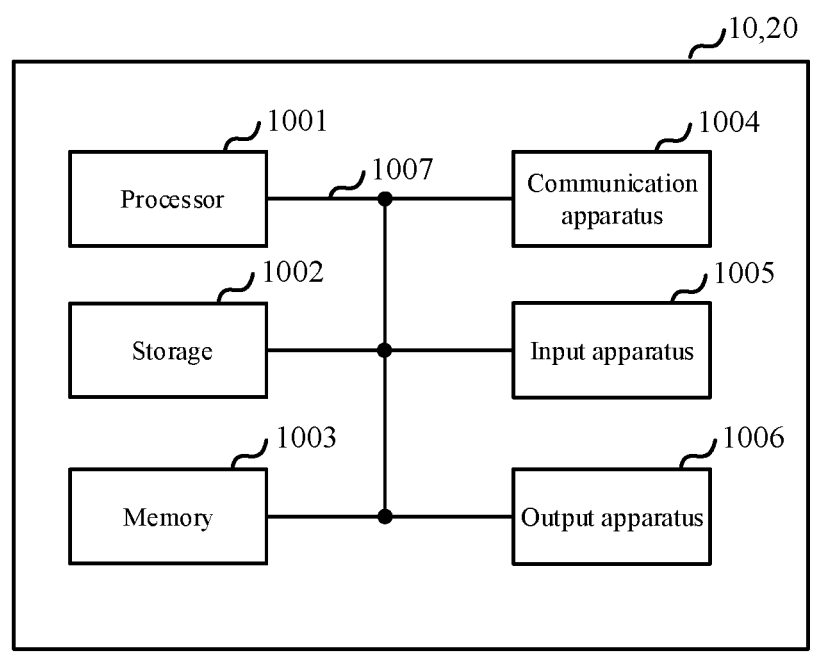
FIG. 11 is a diagram showing an example of a hardware structure of a base station and a user equipment involved in one implementation of the present invention.

For example, the base station, the user equipment and so on in the embodiments of the present invention may function as a computer that executes the processes of the radio communication method of the present invention. FIG. 11 is a diagram showing an example of a hardware structure of a base station and a user equipment involved in one embodiment of the present invention. The above described base station 10 and user equipment 20 may be physically designed as a computer apparatus including a processor 1001, a storage 1002, a memory 1003, a communication apparatus 1004, an input apparatus 1005, an output apparatus 1006, and a bus 1007 and the like.

It should be noted that, in the following description, the word "unit" may be replaced by "circuit", "device", "apparatus" and so on. It should be noted that the hardware structure of the base station 10 and the user equipment 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented either simultaneously or in sequence, or in different manners, on two or more processors. It should be noted that the processor 1001 may be implemented with one or more chips.

Each function of the base station 10 and the user equipment 20 is implemented by reading predetermined software (program) on hardware such as the processor 1001 and the memory 1002, so as to make the processor 1001 perform calculations, and by controlling the communication carried out by the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the generating unit 101, the determining unit 202, and the like described above may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control unit 401 of the user equipment 20 may be implemented by a control program stored in the memory 1002 and operated by the processor 1001. For other function blocks, they can also be implemented in the same way. The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register", a "cache", a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device", a "network controller", a "network card", a "communication module" and so on. The communication apparatus 1004 may include a high frequency switch, a duplexor, a filter, a frequency synthesizer, and the like, in order to realize, for example, Frequency Division Duplex (FDD) and/or Time Division Duplex (TDD). For example, the above-described transmitting unit 102, receiving unit 201, and the like may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing transmitting output to the outside (for example, a display, a speaker, an LED (Light Emitting Diode) lamp and so on). It should be noted that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the base station 10 and the user equipment 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be installed with at least one of these pieces of hardware.

(Variations)

It should be noted that the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be referred to as a cell, a frequency carrier, a carrier frequency, or the like.

In addition, the radio frame may be composed of one or more periods (frames) in the time domain. Each of the one or more periods (frames) constituting the radio frame may also be referred to as a subframe. Further, a subframe may be composed of one or more slots in the time domain. The subframe may be a fixed length of time duration (e.g., 1 ms) that is independent of the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Furthermore, the slot may also be a time unit configured based on parameter. Furthermore, a slot may also include a plurality of microslots. Each microslot may be comprised of one or more symbols in the time domain. Furthermore, a microslot may also be referred as "a subframe".

A radio frame, a subframe, a slot, a microslot and a symbol all represent the time unit when transmitting signals. A radio frame, a subframe, a slot, a microslot and a symbol may also use other names that correspond to each other. For example, one subframe may be referred to as a "transmission time interval (TTI)", and a plurality of consecutive subframes may also be referred to as a "TTI", and one slot or one microslot may also be referred to as a "TTI." That is, a subframe and/or a TTI may be a subframe (1 ms) in existing LTE, may be a shorter period than 1 ms (for example, one to thirteen symbols), or may be a longer period of time than 1 ms. It should be noted that a unit indicating a TTI may also be referred to as a slot, a microslot, or the like instead of a subframe.

Here, a TTI refers to the minimum time unit of scheduling in radio communication, for example. For example, in LTE systems, a base station schedules the radio resources (such as the frequency bandwidth and transmission power that can be used in each user terminal) to allocate to each user terminal in TTI units. It should be noted that the definition of TTIs is not limited to this.

TTIs may be channel-coded data packets (transport blocks), code blocks, and/or codeword transmission time units, or may be the unit of processing in scheduling, link adaptation and so on. It should be noted that, when a TTI is given, the time interval (e.g., the number of symbols) actually mapped to the transport block, code block, and/or codeword may also be shorter than the TTI.

It should be noted that, when one slot or one microslot is called a TTI, more than one TTI (i.e., more than one slot or more than one microslot) may also become the scheduled minimum time unit. Furthermore, the number of slots (the number of microslots) constituting the minimum time unit of the scheduling may be controlled.

A TTI having a time duration of 1 ms may be referred to as a "normal TTI" (TTI in LTE Rel. 8 to 12), a "standard TTI", a "long TTI", a "normal subframe", a "standard subframe", or a "long subframe", and so on. A TTI that is shorter than a normal TTI may be referred to as a "shortened TTI", a "short TTI", a "partial (or fractional) TTI", a "shortened subframe", a "short subframe", a "microslot", or a "short microslot" and so on.

It should be noted that, a long TTI (e.g., a normal TTI, a subframe, etc.) may be replaced with a TTI having a time duration exceeding 1 ms, and a short TTI (e.g., a shortened TTI, and so on) may also be replaced with a TTI having a TTI duration shorter than the long TTI and a TTI duration exceeding 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one microslot, one subframe or one TTI duration. One TTI and one subframe each may be comprised of one or more resource blocks, respectively. It should be noted that one or more RBs may also be referred to as a "physical resource block (PRB (Physical RB))", a "Sub-Carrier Group (SCG)", a "Resource Element Group (REG)", a "PRG pair", an "RB pair" and so on.

Also, a resource block may also be composed of one or more resource elements (RE). For example, one RE can be a radio resource area of a subcarrier and a symbol.

It should be noted that the above-described structures of radio frames, subframes, slots, microslots and symbols and so on are simply examples. For example, configurations such as the number of subframes included in a radio frame, the number of slots of each subframe or radio frame, the number or microslots included in a slot, the number of symbols and RBs included in a slot or microslot, the number of subcarriers included in an RB, the number of symbols in a TTI, the symbol duration and the cyclic prefix (CP) duration can be variously changed.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs).

In addition, reporting of predetermined information (for example, reporting of "X") is not limited to explicit reporting, but may be performed by implicitly reporting (for example, by not performing reporting of the predetermined information, or by reporting of other information).

Determination may be performed using a value (0 or 1) indicated by 1 bit, may be performed using a Boolean value (true or false), or may be performed by comparison of numerical values (for example, comparison with a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

The terms "Base Station (BS)", "radio base station", "eNB", "gNB", "cell", "sector", "cell group", "carrier" and "component carrier" herein are used interchangeably. A base station is sometimes referred to by a fixed station, a NodeB, an eNodeB (eNB), an access point, a transmission point, a reception point, a femto cell, a small cell, and the like.

A base station can accommodate one or more (e.g., three) cells (also referred to as sectors). When the base station accommodates a plurality of cells, an entire coverage region of the base station may be divided into a plurality of smaller regions, and each smaller region may also provide communication services through a base station subsystem (for example, a small indoor base station (a Remote Radio Head (RFH))). The term "cell" or "sector" refers to a part or the entirety of the coverage region of a base station and/or a base station subsystem that performs communication services in the coverage.

The terms "Mobile Station (MS)", "user terminal", "User Equipment (UE)" and "terminal" herein are used interchangeably. A base station is sometimes referred to by a fixed station, a NodeB, an eNodeB (eNB), an access point, a transmission point, a reception point, a femto cell, a small cell, and the like.

A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

In addition, a base station herein may also be replaced with a user equipment. For example, respective modes/embodiments of the present invention may be applied to a structure in which communication between a base station and a user equipment is replaced with (Device-to-Device (D2D) communication among a plurality of user equipments. At this time, a function of the above-described base station 10 may be regarded as a function of a user equipment 20. In addition, words such as "uplink" and "downlink" may also be replaced with "side". For example, an uplink channel may also be replaced with a side channel.

Similarly, a user equipment herein may also be replaced with a base station. At this time, a function of the above-described user equipment 20 may be regarded as a function of the base station 10.

In this specification, it is assumed that a specific action performed by a base station is also performed by an upper node (upper node) thereof according to situations. Obviously, in a network composed of one or more network nodes having a base station, various actions performed for communication with the terminal may be performed by the base station, one or more network nodes other than the base station (for example, a Mobility Management Entity (MME), a Serving-Gateway (S-GW), etc., may be considered), or a combination thereof.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judging" and "determining" as used herein may encompass a wide variety of actions. For example, "judging" and "determining" may be interpreted to mean making judgements and determinations related to calculating, computing, processing, deriving, investigating, looking up (for example, searching a table, a database or some other data structure), ascertaining and so on. Furthermore, "judging" and "determining" may be interpreted to mean making judgements and determinations related to receiving (for example, receiving information), transmitting (for example, transmitting information), inputting, outputting, accessing (for example, accessing data in a memory) and so on. In addition, "judging" and "determining" as used herein may be interpreted to mean making judgements and determinations related to resolving, selecting, choosing, establishing, comparing and so on. In other words, "judging" and "determining" may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A method performed by a user equipment, comprising:
receiving at least one piece of downlink control information for feeding back corresponding HARQ-ACKs to a plurality of user equipments transmitted by a base station, wherein the plurality of user equipments include the user equipment and other user equipments; and
determining a HARQ-ACK corresponding to the user equipment, based on an implicit mapping relationship between the user equipment and one or more information bits of the downlink control information,
wherein the implicit mapping relationship comprises an implicit mapping relationship established between the user equipment and the one or more information bits of the downlink control information, based on an Enhanced Control Channel Element ECCE index for uplink shared channel transmission allocated by the base station to the user equipment.

2. The method according to claim 1, wherein,
the implicit mapping relationship further comprises an implicit mapping relationship established between the user equipment and the one or more information bits of the downlink control information, based on a resource location for uplink data transmission allocated by the base station to the user equipment,
the determining a HARQ-ACK corresponding to the user equipment includes: determining the one or more information bits of the downlink control information that correspond to the user equipment, based on a resource location for uplink data transmission allocated by the base station to the user equipment, so as to extract the HARQ-ACK corresponding to the user equipment.

3. The method according to claim 2, wherein, one information bit of the downlink control information corresponds to a single resource location or a resource location group.

4. The method according to claim 2, wherein, the at least one piece of downlink control information refers to a plurality of pieces of downlink control information, and the plurality of pieces of downlink control information respectively correspond to different resource location groups.

5. The method according to claim 4, wherein,
each piece of downlink control information includes a cyclic redundancy check scrambled according to a fixed scrambling identifier (HARQ-RNTI), for identifying that the downlink control information is information for feeding back corresponding HARQ-ACK to the user equipment, and the different resource location groups are identified by resource location group identifiers in the downlink control information, and
the determining a HARQ-ACK corresponding to the user equipment includes:
determining, based on the resource location for the user equipment, a resource location group identifier corresponding thereto; and
determining, based on the resource location group identifier, downlink control information corresponding to the user equipment, and determining a corresponding information bit in the corresponding downlink control information.

6. The method according to claim 4, wherein,
each piece of downlink control information includes a cyclic redundancy check scrambled according to scrambling identifiers specific to resource location groups (HARQ-RNTIs), for identifying that the downlink control information is information for feeding back corresponding HARQ-ACK to the user equipment, and the different resource location groups are identified by the scrambling identifiers specific to the resource location groups, and
the determining a HARQ-ACK corresponding to the user equipment includes:
determining, based on the resource location for the user equipment, a scrambling identifier specific to a resource location group to which the user equipment belongs;
checking each piece of downlink control information, by employing the determined scrambling identifier and the scrambled cyclic redundancy check; if the check is passed, determining that the downlink control information corresponds to the resource location group to which the user equipment belongs, and further determining, based on the resource location for the user equipment, a corresponding information bit of the corresponding downlink control information.

7. The method according to claim 1, wherein,
the determining a HARQ-ACK corresponding to the user equipment includes: determining the one or more information bits of the downlink control information that correspond to the user equipment, based on the Enhanced Control Channel Element ECCE index for uplink shared channel transmission allocated by the base station to the user equipment, so as to extract the HARQ-ACK corresponding to the user equipment.

8. A base station comprising:
a processor, configured to generate, by employing a plurality of HARQ-ACKs corresponding to a plurality of user equipments, at least one piece of downlink control information, wherein for each user equipment, an implicit mapping relationship exists between the user equipment and one or more information bits of the downlink control information; and
a transmitting unit, configured to transmit to the plurality of user equipments the downlink control information;
wherein the processor is further configured to:
allocate, to each of the plurality of user equipments, an Enhanced Control Channel Element ECCE index for uplink shared channel transmission, and
for each user equipment, establish an implicit mapping relationship between the user equipment and the one or more information bits of the downlink control information, based on an Enhanced Control Channel Element ECCE index for uplink shared channel transmission allocated by the processor.

9. The base station according to claim 8, wherein
the processor is further configured to:
allocate a resource location for uplink data transmission to each of the plurality of user equipments, and
for each user equipment, establish an implicit mapping relationship between the user equipment and the one or more information bits of the downlink control information, based on a resource location for uplink data transmission allocated by the processor to the user equipment.

10. The base station according to claim 9, wherein, one information bit of the downlink control information corresponds to a single resource location or a resource location group.

11. The base station according to claim 9, wherein, the at least one piece of downlink control information refers to a plurality of pieces of downlink control information, and the plurality of pieces of downlink control information respectively correspond to different resource location groups.

12. The base station according to claim 11, wherein, the processor is:
configured to scramble a cyclic redundancy check according to a fixed scrambling identifier (HARQ-RNTI), for identifying that the downlink control information is information for feeding back corresponding HARQ-ACKs to the plurality of user equipments; and
configured to set a resource location group identifier in each piece of downlink control information, for identifying a resource location group corresponding to the piece of downlink control information.

13. The base station according to claim 11, wherein, the processor is configured to scramble a cyclic redundancy check according to scrambling identifiers specific to resource location groups (HARQ-RNTIs), for identifying that the downlink control information is information for feeding back corresponding HARQ-ACKs to the plurality of user equipments, and identifying resource location groups corresponding to the downlink control information.

14. A user equipment comprising:
a receiving unit, configured to receive at least one piece of downlink control information for feeding back corresponding HARQ-ACKs to a plurality of user equipments transmitted by a base station, wherein the plurality of user equipments include the user equipment and other user equipments; and
a processor, configured to determine a HARQ-ACK corresponding to the user equipment, based on an implicit mapping relationship between the user equipment and one or more information bits of the downlink control information,
wherein the implicit mapping relationship comprises an implicit mapping relationship established between the user equipment and the one or more information bits of the downlink control information, based on an Enhanced Control Channel Element ECCE index for uplink shared channel transmission allocated by the base station to the user equipment.

15. The user equipment according to claim 14, wherein, the implicit mapping relationship further comprises an implicit mapping relationship established between the user equipment and the one or more information bits of the downlink control information, based on a resource location for uplink data transmission allocated by the base station to the user equipment,
the processor is further configured to: determine the one or more information bits of the downlink control information that correspond to the user equipment, based on a resource location for uplink data transmission allocated by the base station to the user equipment, so as to extract the HARQ-ACK corresponding to the user equipment.

16. The user equipment according to claim 15, wherein, one information bit of the downlink control information corresponds to a single resource location or a resource location group.

17. The user equipment according to claim 14, wherein, the processor is further configured to: determine the one or more information bits of the downlink control information that correspond to the user equipment, based on the Enhanced Control Channel Element ECCE index for uplink shared channel transmission allocated by the base station to the user equipment, so as to extract the HARQ-ACK corresponding to the user equipment.

18. The user equipment according to claim 17, wherein, the at least one piece of downlink control information refers to a plurality of pieces of downlink control information, and the plurality of pieces of downlink control information respectively correspond to different resource location groups.

19. The user equipment according to claim 18, wherein, each piece of downlink control information includes a cyclic redundancy check scrambled according to a fixed scrambling identifier (HARQ-RNTI), for identifying that the downlink control information is information for feeding back corresponding HARQ-ACK to the user equipment, and the different resource location groups are identified by resource location group identifiers in the downlink control information, and
the processor is further configured to:
determine, based on the resource location of the user equipment, a resource location group identifier corresponding thereto; and
determine, based on the resource location group identifier, downlink control information corresponding to the user equipment, and determine a corresponding information bit of the corresponding downlink control information.

20. The user equipment according to claim 18, wherein, each piece of downlink control information includes a cyclic redundancy check scrambled according to scrambling identifiers specific to resource location groups (HARQ-RNTIs), for identifying that the downlink control information is information for feeding back corresponding HARQ-ACK to the user equipment, and the different resource location groups are identified by the scrambling identifiers specific to the resource location groups, and
the processor is further configured to:
determine, based on the resource location for the user equipment, a scrambling identifier specific to a resource location group to which the user equipment belongs;
check each piece of downlink control information, by employing the determined scrambling identifier and the scrambled cyclic redundancy check;
if the check is passed, determine that the downlink control information corresponds to the resource location group to which the user equipment belongs, and further determine, based on the resource location for the user equipment, a corresponding information bit of the corresponding downlink control information.

* * * * *